Figure 1:
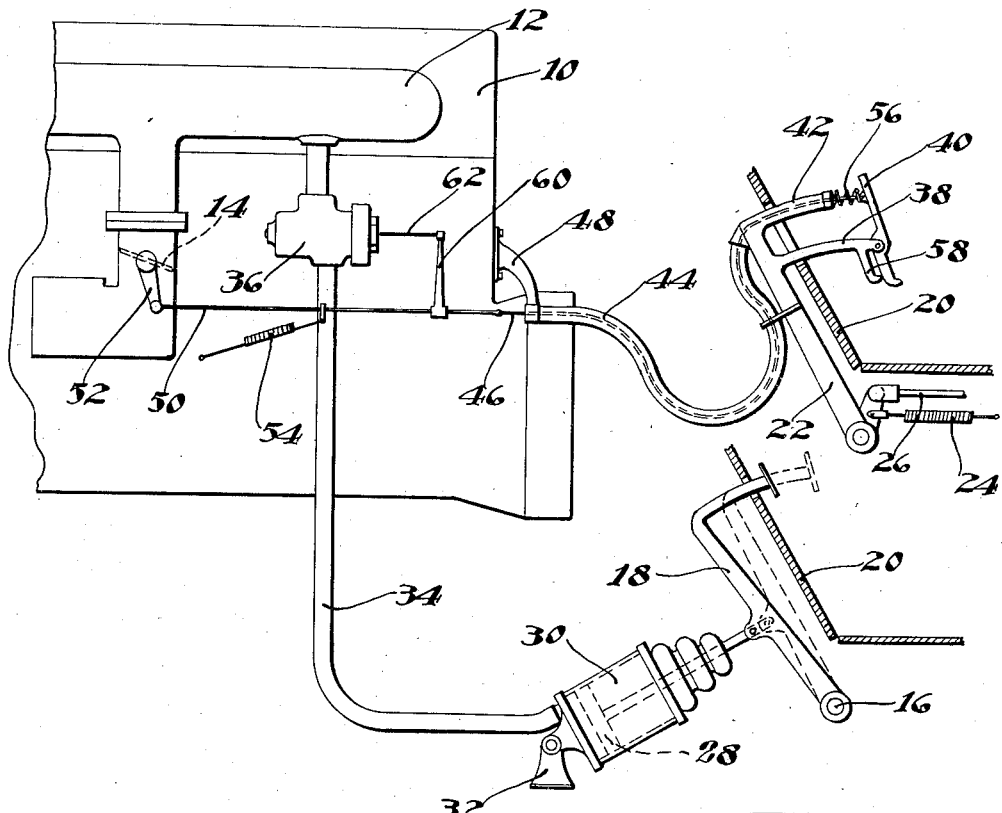

May 28, 1935.  R. S. SANFORD  2,002,511
CONTROL MECHANISM
Filed Aug. 28, 1931

INVENTOR.
Roy S. Sanford
BY
M. W. McConkey
ATTORNEY.

Patented May 28, 1935

2,002,511

UNITED STATES PATENT OFFICE 2,002,511

CONTROL MECHANISM

Roy S. Sanford, South Bend, Ind., assignor to Bragg-Kliesrath Corporation, South Bend, Ind., a corporation of New York Application August 28, 1931, Serial No. 560,005

2 Claims. (Cl. 192—.01)

This invention relates to automobiles, and is illustrated as embodied in a novel simple mechanism for controlling the brakes and the clutch and the throttle valve of an automobile.

In one desirable arrangement, the brake pedal or its equivalent carries means, such as a secondary pedal, for controlling the clutch and preferably also the throttle valve, thereby giving to the driver's right foot control of everything affecting the speed of the car. I prefer to use power means, actuated for example by suction from the intake manifold, for operating the clutch, connecting the valve or other power-controlling device to the secondary pedal described above.

The brake pedal shown in the drawing also embodies novel features in the mounting thereon of a secondary pedal for the purpose described above, and in the connection thereto of a Bowden control or the like actuated by the secondary pedal.

Figure 2:
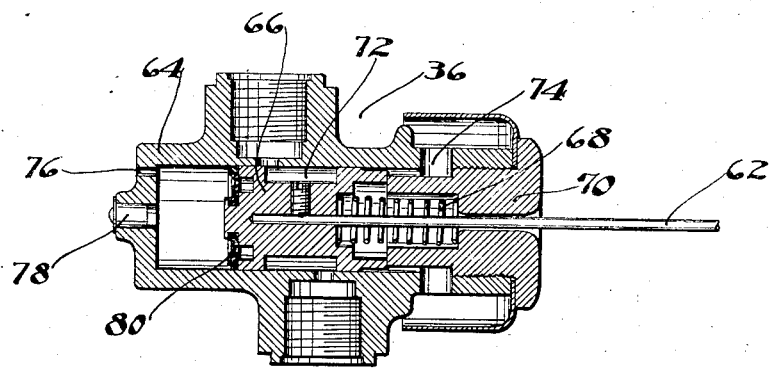

The above and other objects and features of the invention, including various novel combinations of parts and desirable particular constructions, will be apparent from the following description of the illustrative embodiment shown in the accompanying drawing, in which:

Figure 1 is a diagrammatic longitudinal section through part of an automobile chassis, showing the above-described control parts in side elevation; and Figure 2 is a section through the clutch-controlling valve.

In the arrangement illustrated, the vehicle has the usual engine 10 with intake manifold 12 and an engine-speed controlling throttle valve 14. It also has the usual clutch (not shown) operated by a clutch shaft 16 operated by the usual clutch pedal 18 or its equivalent. The clutch pedal extends upwardly through the floorboard 20 immediately adjacent a novel brake pedal 22 having a return spring 24, and which is connected by a link 26 or the like to the usual four-wheel brake system.

I prefer to provide power means for operating the clutch, the connection conveniently being to the clutch pedal 18. The power means is illustrated as a vacuum device operated by suction from the intake manifold 12, and may include a piston 28 in a cylinder 30 pivoted to a fixed bracket 32, the cylinder being connected to the manifold through a conduit 34 controlled by a valve 36. Cylinder 30 may be provided with suitable damping means for insuring smooth clutch engagement, but this forms no part of the present invention and is therefore not illustrated.

The brake pedal 22 has two parts extending therefrom in the direction of pedal movement, the lower part 38 having mounted thereon a member shown as a pivoted secondary pedal 40, and the upper part 42 having secured thereto a flexible Bowden conduit 44 and being hollow to guide a Bowden connection such as a wire 46 connected to the secondary pedal 40.

The left end of the conduit 44 is secured to a bracket 48 fixed on the engine, and the wire 46 is connected to a rod or the like 50 extending to an arm 52 actuating the throttle 14 against the resistance of a return spring 54. An auxiliary return spring 56, stronger than spring 54, may be sleeved about wire 46 between part 42 and the secondary pedal 40, this spring also serving to urge the secondary pedal against a stop 58 formed on part 38 and predetermining the clutch-released position of the secondary pedal 40.

Connection 50 also carries a bracket or the like 60 connected, for example by a wire 62, to operate the clutch control valve 36.

The details of one form of clutch control valve are shown in Figure 2. This particular valve includes a casing 64, forming a cylinder for a valve piston 66 connected to the end of wire 62. Piston 66 is urged toward the left by a spring 68, lighter than spring 54 or spring 56, and confined between the end of the valve piston and a plug 70 threaded into the valve casing and forming a guide for wire 62. Plug 70 also serves to determine the extreme right-hand position of the valve piston 66.

With the valve piston in its right-hand position as shown, against plug 70 and with spring 68 under compression, the intake manifold 12 communicates with cylinder 30 through an annular passage 72 in the valve piston, thereby drawing pedal 18 downwardly and disengaging the clutch. This is the position of the parts, regardless of the position of the brake pedal 22, when the secondary pedal 40 is in its uppermost position in engagement with the stop 58.

Depressing the secondary pedal 40, by rocking it about its pivotal connection to part 38, allows spring 54 to open the throttle, and at the same time allows spring 68 to shift the valve piston 66 to the left, cutting off communication from the intake manifold and connecting cylinder 30 with air passages 74 in the valve casing. The clutch is thereupon caused to engage by the pressure of its spring, in the usual way.

The valve casing is shown with a small vent opening 76 and with an inwardly opening check valve 78, so that piston 66 moves freely toward the right to disengage the clutch, but has a damped action toward the left to cause the clutch to engage. A friction washer 80 carried by the valve piston also regulates its movement toward the left, to cause damped movement.

This particular valve is not claimed herein per se, as it is covered by an application of Victor W. Kliesrath, No. 568,081, filed October 10, 1931.

It will be seen that the secondary pedal 40 is given a bodily movement to control the brakes, and a rocking movement to control the throttle and the clutch, thus permitting complete control of the car speed by the driver by his right foot only. At the same time the clutch pedal 18 can be operated manually, if desired.

While one illustrative embodiment has been described in detail, it is not my intention to limit the scope of the invention by that description, or otherwise than by the terms of the appended claims.

It is not my intention to claim herein any subject matter covered by applications Nos. 557,241 and 557,242, filed August 15, 1931.

I claim:

1. A vehicle provided with a throttle, a valve controlled fluid power operated clutch, and a brake, and a common manually operable means for controlling the operation of each of said controls, said means comprising a pedal member, means interconnecting said pedal and brake, a supplemental clutch and throttle control pedal member pivotally mounted on said brake pedal member, a flexible conduit connected at one of its ends to a fixed portion of the vehicle and at its remaining end to said brake operating pedal, a flexible connection connected at one of its ends to said supplemental pedal and at its remaining end to said throttle, and a connection interconnecting the control valve of said clutch operating power means and said flexible connection whereby the clutch and throttle may be operated with operation of the supplemental pedal and the brake may be operated, with operation of the first mentioned pedal to the exclusion of the operation of the throttle and clutch.

2. A vehicle provided with a throttle, a valve controlled fluid power operated clutch and a brake, and a common manually operable means for controlling the operation of each of said controls, said means comprising a pedal member, means interconnecting said pedal and brake, a supplemental clutch and throttle control pedal member pivotally mounted on said brake member for angular movement in the plane of movement of the aforementioned pedal member, means interconnecting said supplemental pedal member with the throttle and clutch control means whereby the clutch and throttle may be operated with operation of the supplemental pedal and the brake may be operated with the operation of the first-mentioned pedal to the exclusion of the operation of the throttle and clutch.

ROY S. SANFORD.